United States Patent
Buyukkoc et al.

(10) Patent No.: US 6,452,902 B1
(45) Date of Patent: *Sep. 17, 2002

(54) INTEGRATING SWITCHING AND FACILITY NETWORKS USING ATM

(75) Inventors: Cagatay Buyukkoc, Holmdel, NJ (US); David J. Houck, Colts Neck, NJ (US); Pravin Kumar Johri, Aberedeen, NJ (US); Kathleen S. Meier-Hellstern, Cranbury, NJ (US); Rodolfo Alberto Milito, Piscataway, NJ (US)

(73) Assignee: AT&T Corp., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,240

(22) Filed: Sep. 8, 2000

Related U.S. Application Data

(63) Continuation of application No. 08/974,172, filed on Nov. 19, 1997, now Pat. No. 6,081,506.

(51) Int. Cl.[7] .................................................. H04J 3/24
(52) U.S. Cl. ...................... 370/235; 370/230; 370/389; 370/395.1; 370/409; 370/471
(58) Field of Search ................................. 370/229, 230, 370/231, 235, 351, 389, 394, 395, 409, 412, 471, 254, 397, 408, 410, 411, 414, 418, 395.1, 395.6, 395.64

(56) References Cited

U.S. PATENT DOCUMENTS

| | | | | |
|---|---|---|---|---|
| 6,021,118 A | * | 2/2000 | Houck et al. | 370/254 |
| 6,081,506 A | * | 6/2000 | Buyukkoc et al. | 370/235 |
| 6,157,653 A | * | 12/2000 | Kline et al. | 370/412 |
| 6,275,494 B1 | * | 8/2001 | Endo et al. | 370/395 |

* cited by examiner

Primary Examiner—Douglas Olms
Assistant Examiner—Shick Hom
(74) Attorney, Agent, or Firm—Henry T. Brendzel

(57) ABSTRACT

An efficient approach and corresponding apparatus for selecting virtual paths in a network for routing datagrams achieves effective sharing of capacity without adversely affecting call setup latency. Edge nodes of the network assign calls to virtual paths based on the destination of the call and the current load status of each of a relatively small number of paths. Each call is assigned a VPI (Virtual Path Identifier) corresponding to the path chosen and a VCI (Virtual Circuit Identifier) corresponding to the identity of the call at that edge node. The ATM backbone nodes route calls based solely on the VPI. Capacity management and load balancing is achieved by each edge node keeping track of the load on each access link from its edge node to the rest of the network and of the congestion status of the various links in the network. In one embodiment, the edge node periodically sends information about its usage of the network to a "central fabric network interface" which combines information from all edge nodes, evaluates congestion status for the network links, and forwards that information back to the edge nodes.

1 Claim, 5 Drawing Sheets

INTEGRATING SWITCHING AND FACILITY NETWORKS USING ATM

This is a application of Ser. No. 08/974,172 filed Nov. 19, 1997 now U.S. Pat. No. 6,081,506.

BACKGROUND OF THE INVENTION

This invention relates to a flexible architecture of a telecommunications system using datagrams, such as ATM.

The volume of voice and voice-band calls is increasing markedly, and network providers are being challenged to offer these "plain old telephone" services at competitive prices. ATM presents an opportunity to reduce costs, and is therefore being considered for carrying circuit-switched voice traffic. Conventionally, a circuit-switched network is managed by formulating a logical view of the network that includes a link between most pairs of network switches, and the network is managed at the logical level. The logical view does not necessarily correspond to the actual, physical, network. The logical connections over which routing is performed ride on a facility network. The facility level contains the physical switches and transmission resources. The connections demanded at the logical level are mapped into demands on the facility network. Routes that appear as direct at the logical level may pass through many cross-connects at the physical level.

The partitioning of a circuit-switched network into logical and physical layers results in significant inefficiencies. Physical diversity is difficult to plan for such networks due to the indirect mapping between the logical and physical layers, and such networks have high operations costs due to the constant need to resize trunk groups between switch pairs as the load changes or shifts. Also, sharing of bandwidth is limited to the possible alternate paths at the logical layer. Finally, such networks are difficult to scale as network traffic increases because each switch that is added to the network must be interconnected to all other switches at the logical layer, trunks on existing switches must be re-homed to the new switch, and the routing tables at all other switches in the network must be updated. All of this creates substantial operational load on the network provider. Since facilities are in units of T3 capacity, fragmentation of trunk groups also increases with the size of the network.

ATM networks have the potential to eliminate some of the inefficiencies in traditional circuit-switched networks. In an ATM implementation that creates circuit connections, the logical and physical network separation may or may not be maintained. Voice calls in such a network may be treated as ATM virtual circuits, which may be either Constant Bit Rate (CBR) or Variable Bit Rate (VBR) arrangements, depending on the voice coding scheme. These virtual circuits may be set up using standardized ATM setup procedures and routing protocols—as, for example, in the Private Network-to-Network Interface (PNNI) specification. However, the standard procedures of an ATM network require the ATM switches in the network to perform a substantial amount of computations, which is burdensome and which makes it difficult to operate the network at high load capacities.

SUMMARY

The problems associated with prior solutions for implementing ATM in a large-scale voice network are overcome by providing an efficient means by which capacity in the network is more fully shared without adversely affecting call setup latency, and at the same time simplifying network operations. This is achieved by performing the functions of route setup, routing, and capacity management in an ATM network at the edges of the ATM network. By "edges" what is meant is the interface between an ATM switch of the network and other than another ATM switch of the network; for example, the interface between each ATM switch and customers. In accordance with the principles disclosed herein, the edges contain nodes that form the interface between the backbone ATM switches and the link(s) that interconnect them (i.e., the ATM backbone network) and the outside world. These nodes comprise controllers and other apparatus that in some cases may be incorporated in, or connected as adjuncts to, the ATM switches.

Edge nodes assign calls to virtual paths based on the destination of the call and the current load status of each of a number of preselected paths. Thus, each call is assigned a VPI (Virtual Path Identifier) corresponding to the path chosen and a VCI (Virtual Circuit Identifier) corresponding to the identity of the call at that edge node. The ATM backbone nodes route calls based solely on the VPI. Destination-based routing allows VPIs to be shared among routes from different sources to the same destination.

Capacity management and load balancing is achieved through a Fabric Network Interface (FNI) that is present in each the edge nodes along with a Centralized FNI (CFNI), that maintains backbone link status. The FNI is responsible for keeping track of the load on each access link from its edge node to the backbone ATM switches it homes onto, as well as the load on each backbone link of the calls it originated. This load is measured in normal bandwidth requirements for CBR services and could be measured in effective bandwidths for other services. The FNI is also responsible for periodically sending its information to the CFNI. The CFNI collects the received information and calculates the bandwidth used on each backbone link. It then computes a link status for each access and backbone link and sends this status information to each FNI. This information assists the FNIs in carrying out their tasks.

DETAILED DESCRIPTION

The illustrative embodiment disclosed below speaks in terms of an ATM network and ATM cells, but it should be understood that any network that carries datagrams, such as a network which works in accordance with the IP protocol, can employ the same principles.

Figure 1:
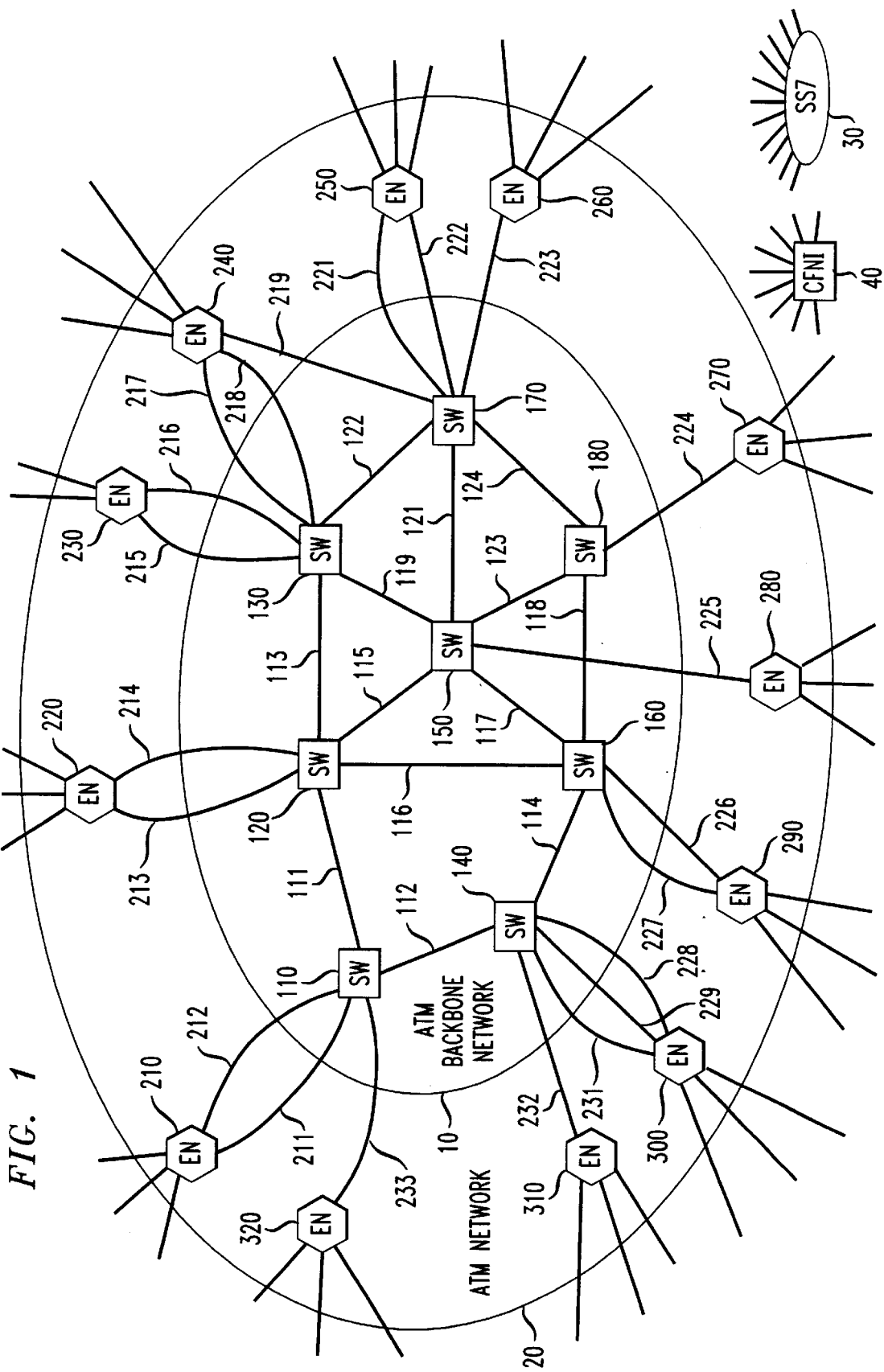
FIG. 1 illustrates a telecommunication system utilizing the present invention.

FIG. 1 illustrates an ATM network 20 which includes a core ATM backbone network 10. Backbone network 10 includes ATM switches 110, 120, 130, 140, 150, 160, 170, and 180 backbone links, or β links, 111–119 and 121–124. Network 20 also includes edge nodes 210, 220, 320, . . . , 310, 320 outside the ATM backbone network, and access links, or α links, 211–219, 221–229 and 231–233 which interconnect the edge nodes to the backbone ATM switches.

An edge node, in the context of this disclosure, is a node that is interposed between customers, or other networks, and the ATM backbone network. In some networks, the edge node may be a physically distinct switch that is either a circuit or a packet switch. In other networks, it may simply be a logical portion of an ATM switch. That is, an edge node 210 can occupy a logical portion of an ATM switch that is part of the backbone network. The processing capability that relates strictly to routing of incoming ATM cells to outgoing links can be thus viewed to belong to the ATM switches, while the processing capability that relates to route set-ups, for example, can be viewed to belong to the edge nodes. Also, some capacity on certain links can be reserved and viewed to constitute $\alpha$ links and the remaining capacity can be viewed to constitute the $\beta$ links. For the sake of simplicity, the following discussion assumes that switches 210, 220, 230, ..., 310, 320 are strictly edge nodes; that is, that they are not included in the backbone ATM network.

FIG. 1 also shows a signaling network 30 that is separate from ATM network 20, e.g., akin to the well-known SS7 signaling network. Signaling network 30 may be employed to signal information between and among the ATM switches and the edge nodes. Accordingly, signaling network 30 is coupled to all of the switches and edge nodes (although for sake of clarity the connections are not shown). Alternatively, the ATM network itself may be used for signaling as well as for communicating the primary information. FIG. 1 further shows a central fabric network interface (CFNI) block 40. It is coupled to the edge nodes of network 20 (although for sake of clarity the connections are not shown), and its function is described in detail below.

It should be noted that edge nodes may be connected to the backbone in a variety of ways:

- An edge node may be connected to an ATM switch via a single physical $\alpha$ link, such as edge node 270 which is connected to ATM switch 180 via 60 link 224.
- A node can be connected to a single ATM switch via two physically distinct $\alpha$ links, such as edge node 220 which is connected to ATM switch 120 via $\alpha$ links 213 and 214.
- More than one edge node can be connected to an ATM switch, such as nodes 210 and 320 which are connected to ATM switch 110 via $\alpha$ links 211 and 212 for edge node 210 and $\alpha$ link 233 for edge node 320.
- Conversely, a node can be connected to a plurality of ATM switches, such as edge node 240 which is connected to ATM switches 130 and 170 via $\alpha$ links 217 and 218 to switch 130 and $\alpha$ link 219 to switch 170.

The inclusion of more than one physical $\alpha$ link from an edge node promotes reliability, and that reliability is further enhanced when the physical $\alpha$ links are connected to different ATM switches.

One of the basic notions of a network according to the principles disclosed herein is simplicity of routing and sharing of link capacity. This is achieved by means of Virtual Path Identifier (VPI) routing. The routing follows a routing map for each destination edge node. The routing map encompasses all of the ATM switches—or at least all of the ATM switches to which edge nodes are connected—and, in some embodiments, the edge nodes as well. Actually, a number of slightly different embodiments are readily realizable in connection with the routing map or maps associated with a given edge node being a destination node. In one embodiment, for example, the destination edge node and the ATM switch that homes onto that edge node can be viewed as a unit, allowing the network to view the connection between the destination edge node and the associated ATM switch as one having a single logical path; i.e., there would be a single VPI that defined the path to the destination ATM switch. This would leave the edge node and the ATM switch with the task of allocating traffic among the various physical links between the edge node and the associated ATM switch. For example ATM switch 120 as a destination is equivalent to edge node 220 as a destination. Accordingly, there would be a single routing map for edge node 220 as a destination. In the case of edge node 240, however, there would be two routing maps: one that would home onto ATM switch 130, and one that would home onto ATM switch 170. For situations where more than one edge node is coupled to an ATM switch, that would require the destination ATM switch to extend calls to the different edge nodes based on the voice circuit identifier (VCI).

In another embodiment, a different VPI may be used for each edge node, but the specific link that is used by the ATM switch that is coupled to the edge node is left to the discretion of the ATM and the associated edge node.

In still another embodiment, the VPI to a particular node also specifies the $\alpha$ link that is used from the ATM switch to the edge node. Thus, a path is constructed from an $\alpha$ link and a VPI selected by the transmitting edge node. The $\alpha$ link specifies the link that is used to enter the backbone network, and the VPI specifies the complete path to the destination edge node. The link can be selected a priority, or can be selected dynamically, based on load, priority order, etc. It is this approach that is employed in the illustrations presented below. To establish a connection path, an edge node consults its own database to determine whether a path exists that has available capacity. When such a path exists, it is chosen by selecting a VPI, and the routing is set up according to the selected VPI. Advantageously, the set of paths that comprise the routing map is as disjoint and as short as possible.

In order to simplify the routing tables illustrated herein, the following discussion employs the approach where transmitting edge nodes select an outgoing link and a VPI, and manage the paths. To do that, each edge node is kept informed of the status of the $\alpha$ and $\beta$ links in the network, and what links are involved in each VPI. By comparison, the ATM switches are dumb. All that they need to know is where to route signals that carry a particular VPI designation.

Figure 2:
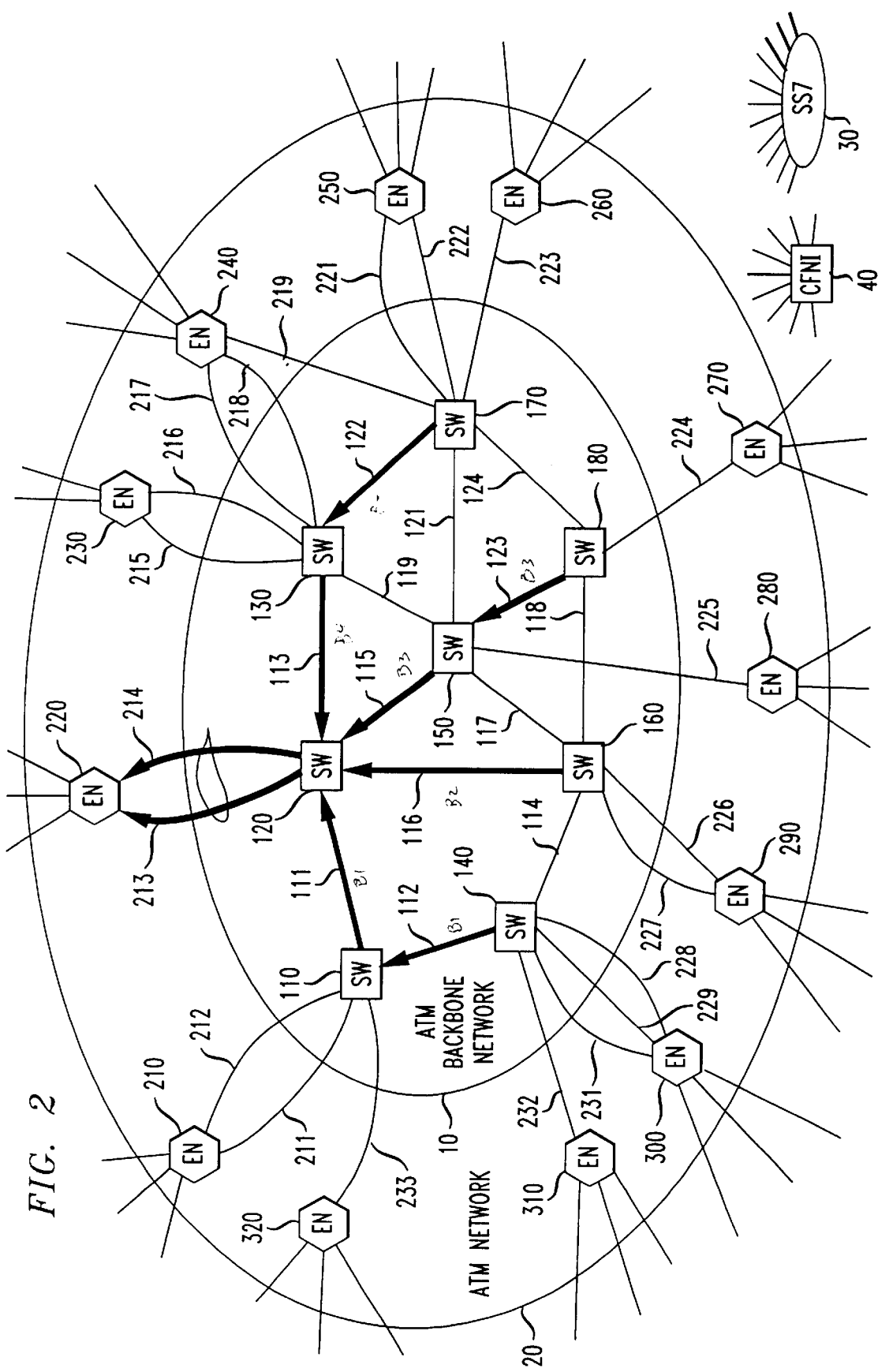
FIG. 2 illustrates a routing map for edge node 220 of the FIG. 1 network.
Figure 3:
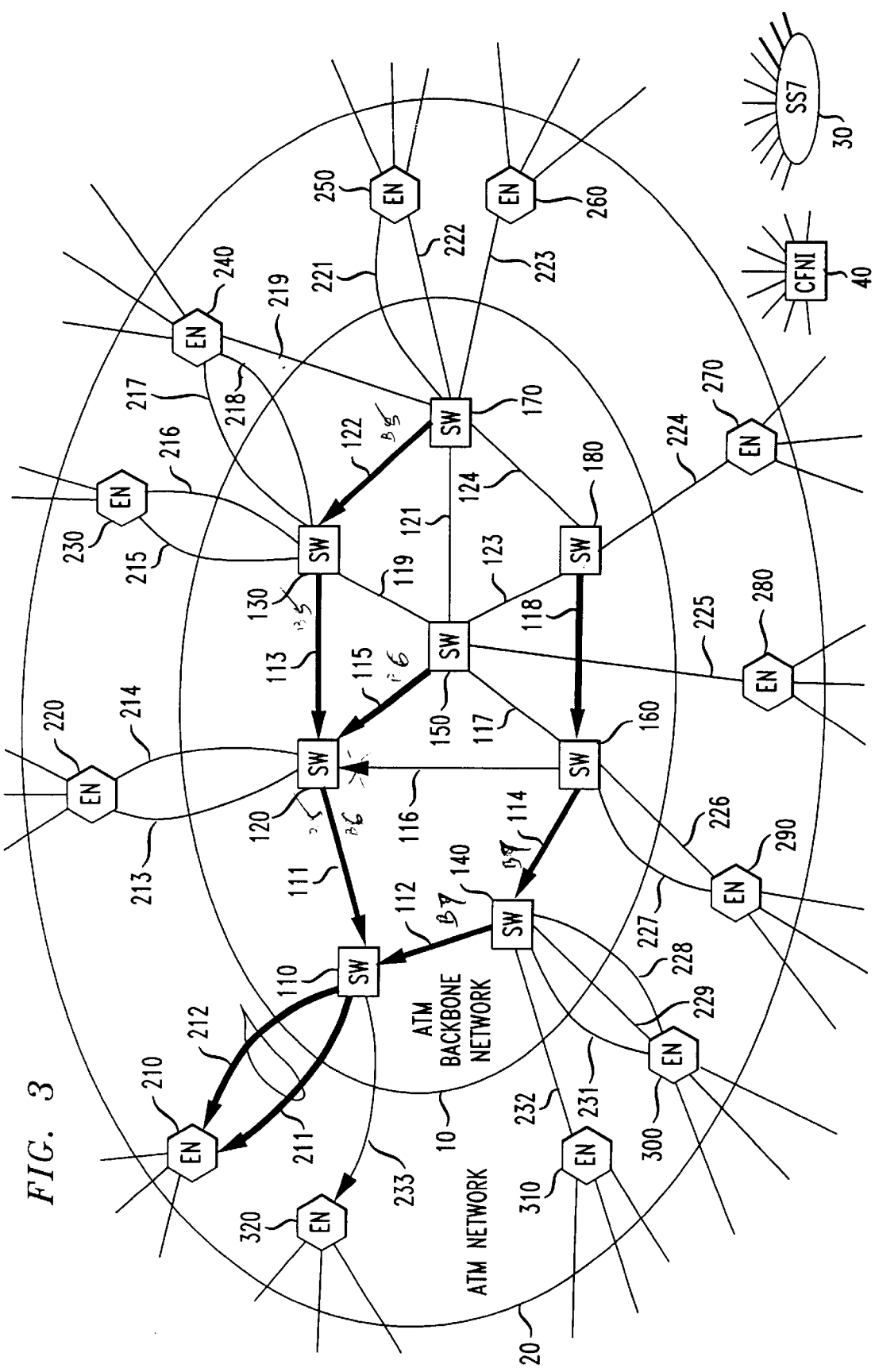
FIG. 3 illustrates a routing map for edge node 210 of the FIG. 1 network.
Figure 4:
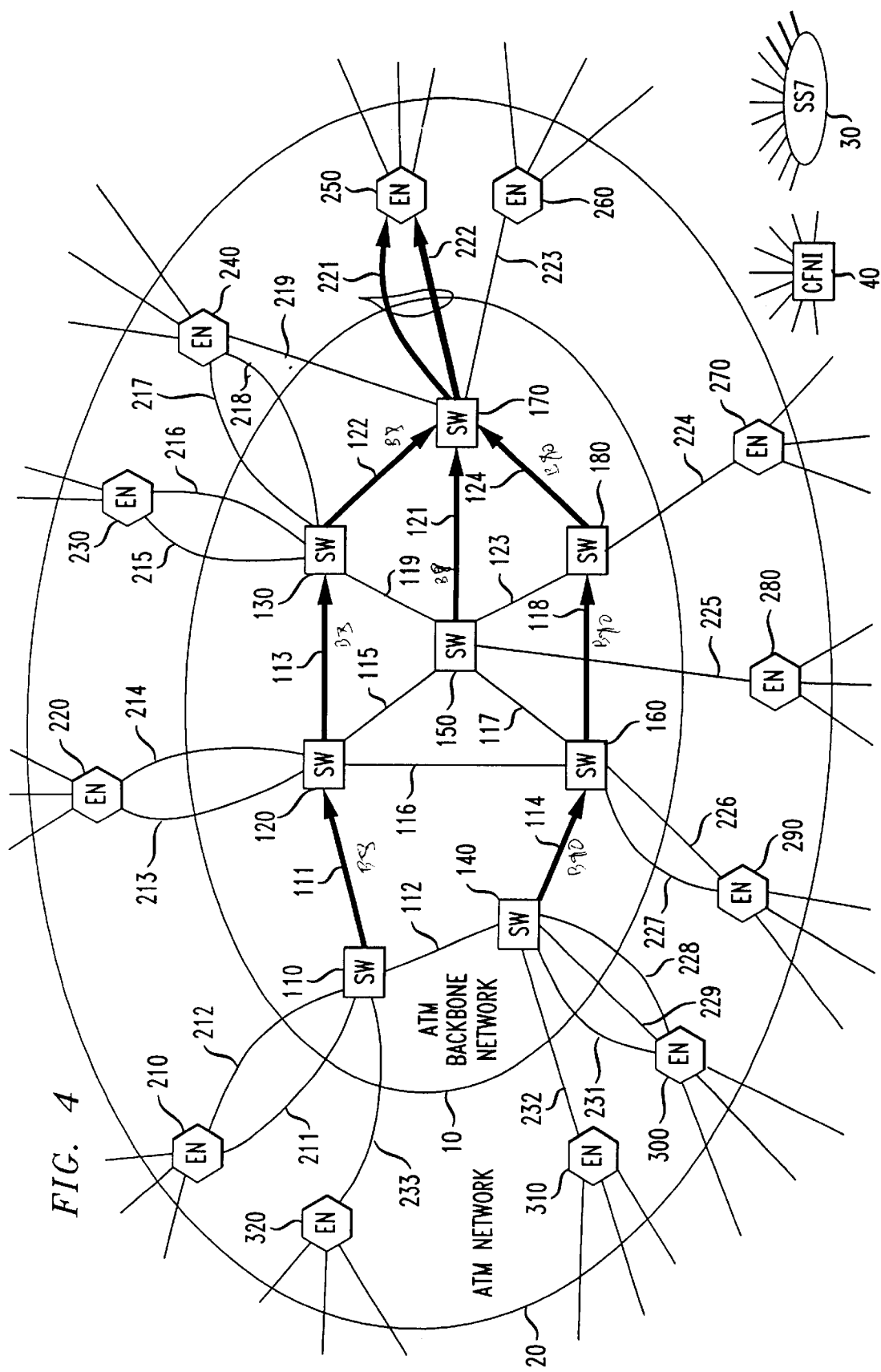
FIG. 4 illustrates a routing map for edge node 250 of the FIG. 1 network.

FIG. 2 presents an illustrative routing map for edge node 220 as a destination node; FIG. 3 illustrates a routing map for edge node 210 as a destination node; and FIG. 4 illustrates a routing map for edge node 250 as the destination node. FIGS. 2–4 represent the same network shown in FIG. 1. It may be noted that FIGS. 2, 3 and 4 employ $\alpha$ links 214, 212, and 221, respectively. It is reasonable to expect that a system designer would likely create another set of maps for edge nodes 220, 210 and 250 and those maps would utilize the other $\alpha$ links (213, 211, and 222), as well as another arrangement of paths through network 10. Such other arrangement of paths offers diversity, which increases reliability. For sake of simplicity, however, only the set of maps presented in FIGS. 2–4 is considered below.

Thus, in accordance with the illustrative embodiment presented herein, each switch stores a plurality of information sets in the routing table, and each set represents the routing necessary for reaching a particular each edge node as a destination. The table below illustrates the routing table portion within switch 170 for calls destined to edge node 220. Before perusing the table, one might make reference to FIG. 2 and note that there are four $\beta$ links coupled to switch 120: links 111, 113, 115, and 116. Moreover, it so happens that each of the four links belongs to a different VPI. Link 111 belongs to VPI B1 (illustrative VPI designation) which comprises links 111 and 112; link 116 belongs to VPI B2, which comprises only link 116; link 115 belongs to VPI B3 which comprises links 115 and 123; and link 113 belongs to VPI B4 which comprises links 113 and 122. With respect to calls arriving at switch 170 that are destined to edge node 220, calls can be directed to edge node 220 via link 122 (VPI path B4); calls can also be directed to link 121 to join VPI path B3; calls can further be directed to link 124 and thereafter link 118 to join VPI path B2; and calls can still further be directed from link 118 to link 114 to join VPI path B1.

Similarly, in connection with FIG. 3, VPI B5 includes links 122, 113, 111, and 212; VPI B6 includes links 115, 111, and 212; and VPI B7 includes links 114, 112, and 212. In connection with FIG. 4, VPI 8 includes links 111, 113, 122, and 222; VPI B9 includes links 121 and 222; and VPI 10 includes links 114, 118, 124, and 222.

Accordingly, for calls destined for edge node 220, switch 170, for example, would include the entries shown in routing Table I below.

TABLE I (Routing table for edge node 220 being the destination node)

| Input Link | Input VPI | Output Link | Output VPI |
|---|---|---|---|
| 121 | B4 | 122 | B4 |
| 121 | B2 | 124 | B2 |
| 121 | B1 | 124 | B1 |
| 122 | B3 | 121 | B3 |
| 122 | B2 | 124 | B2 |
| 122 | B1 | 124 | B1 |
| 124 | B4 | 122 | B4 |
| 124 | B3 | 121 | B3 |
| 219 or 221 or 222 or 223 | B1 | 124 | B1 |
| 219 or 221 or 222 or 223 | B2 | 124 | B2 |
| 219 or 221 or 222 or 223 | B3 | 121 | B3 |
| 219 or 221 or 222 or 223 | B4 | 122 | B4 |

It may be noted that although each one of the last four entries should really be presented as four separate line entries, the number of entries in Table I is still comfortably low. On the other hand, it should be also remembered that the complete routing table includes eleven more sets like the one shown in Table I above: one for each of the other edge nodes in the FIG. 1 arrangement.

In a typical ATM implementation, VPIs change along a path and are not shared by different paths. In the arrangement disclosed herein, however, the VPIs typically need not change along the path.

Although it simplifies the discussion as well as the operation of the network, it is not critical that the VPIs remain unchanged at each node. What is more important is the ability to fully share capacity over a link and to maintain the identity of paths for capacity management purposes. (In fact, changing VPIs might be useful in sharing voice and data over the same network or in scaling to larger networks.)

Since these routing tables are static and contain no call state information, building reliable redundant switches is greatly simplified. A backup switch that would have the routing table stored in it could instantly be cut-in as a replacement and handle cells delivered to it during an outage.

As an aside, conventionally the ATM cell is 53 octets long and it has a header of 5 octets. Using NNI (Network-Network Interface) addressing, there are 12 bits available for the VPI and 16 bits available or the VCI. This results in 4096 possible VPIs and 65,536 possible VCIs. In accordance with the principles of this disclosure, the destination path is in the VPI field, and the destination call ID is in the VCI field. The VCI is not used in routing. It is only examined by the destination edge node to determine the call identity for proper handling of the cell. The interface to the edge node may be a synchronous trunk, in which case the VCI indicates the particular trunk to be used.

Figure 5:
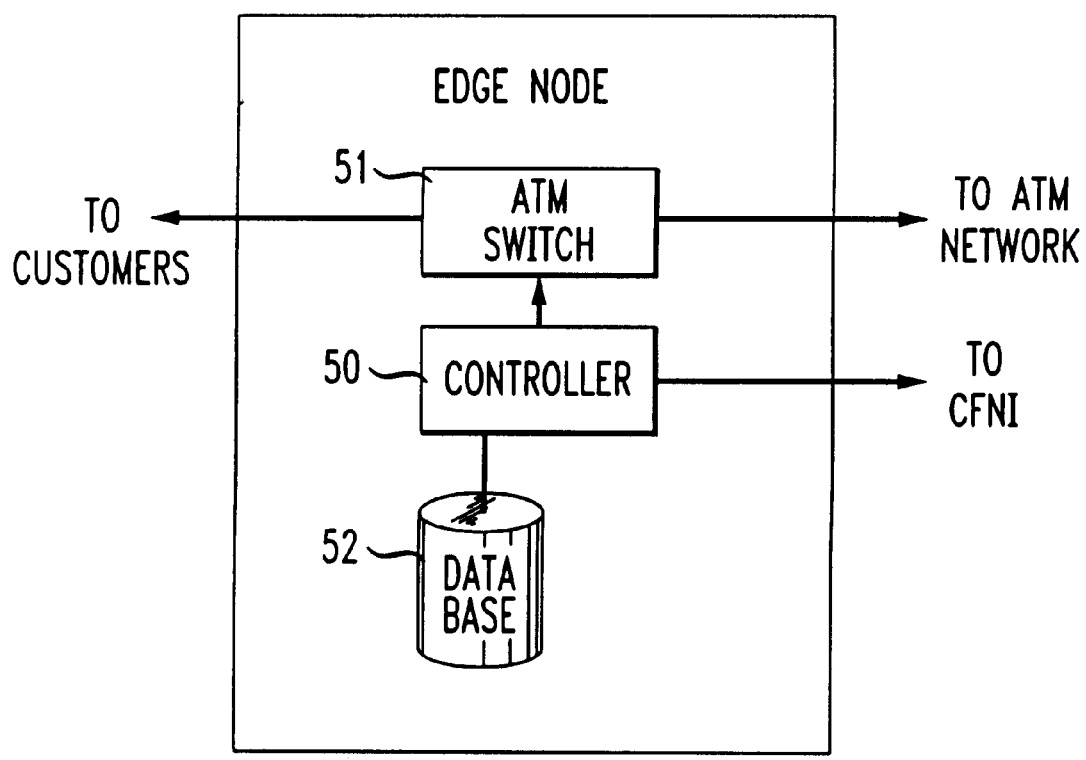
FIG. 5 presents a block diagram of a processor arrangement within edge nodes that implements the route set-ups for the FIG. 1 network.

As may be already surmised from the above, much of the control over utilization of the network's capacity is carried out at the edge nodes; i.e., outside the ATM backbone network. It is assisted by signaling network 30 (when one is used). To carry out the control (and other functions), each edge node includes a processor arrangement such as depicted in FIG. 5. That is, an edge node comprises an ATM switch 51, a controller 50 and a database 52. Database 52 maintains a record of the α and β links provisioning and the traffic on those links. It might be pointed out that the hardware of FIG. 5 may be incorporated within the processing capabilities that are now available in the hardware that is currently used for edge nodes. On the other hand, the hardware of FIG. 5 may be a separate adjunct that is connected to the edge nodes.

The following illustrates one embodiment for the tables that database 52 may contain. In accordance with this embodiment, database 52 contains Table II which specifies the VPIs that are available for reaching a given destination node, Table III which specifies the links involved in each VPI, Table IV which maintains information about the active calls initiated by the edge node, Table V which maintains current information about the contribution by the edge node to the overall traffic in the network; and Table VI which maintains the status of the α and β links. The following illustrates these tables for edge node 270 in the arrangement of FIG. 1. Table II below shows the two sets of VPI information(one for edge node 220 and one for edge node 210). It should be remembered, however, that there are 12 edge nodes and that in an actual implementation there may be more than one set of VPIs for reaching any one edge node.

TABLE II (Destination - VPI table in edge node 270)

| Destination Edge Node | VPI |
|---|---|
| 220 | B4 |
| 220 | B3 |
| 220 | B2 |
| 220 | B1 |
| 210 | B5 |
| 210 | B6 |
| 210 | B7 |
| 250 | B8 |
| 250 | B9 |
| 250 | B10 |

Table III below provides the link specification for the 10 VPIs discussed above. It may be noteworthy that the links involved in a particular VPI differ for different edge nodes.

TABLE III (VPI-Link specification in edge node 270)

| VPI | Links |
|---|---|
| B1 | 118, 114, 112, 111, 214 |
| B2 | 118, 116, 214 |
| B3 | 123, 115, 214 |

TABLE III-continued (VPI-Link specification in edge node 270)

| VPI | Links |
|---|---|
| B4 | 124, 122, 113, 214 |
| B5 | 124, 122, 113, 111, 212 |
| B6 | 123, 115, 111, 212 |
| B7 | 118, 114, 112, 212 |
| B8 | 123, 119, 122, 221 |
| B9 | 123, 121, 221 |
| B10 | 124, 221 |

Table IV maintains the information about the outgoing call legs of edge node 270. This information allow ready access for information about the contribution by edge node 270 to the traffic on the different links in network 20. This information can be computed as needed, of it can be kept in a table and updated as existing call paths are dismantled and new calls are established. Table IV, below illustrates a possible set of outgoing calls supported by edge node 270, and Table V, lists the contribution of traffic by edge node 270 links that are involved in the calls identified in Table IV.

TABLE IV (Active Calls initiated by edge node 270)

| VCI | Bandwidth | Destination edge node | VPI used | α link used |
|---|---|---|---|---|
| V101 | 0.412 | 210 | B7 | 224 |
| V267 | 0.525 | 220 | B3 | 224 |
| V321 | 0.505 | 220 | B2 | 224 |
| V120 | 0.212 | 250 | B10 | 224 |
| V098 | 0.750 | 250 | B9 | 224 |

TABLE V (Traffic Contribution by edge node 270)

| Link | 118 | 114 | 112 | 212 | 123 | 115 | 214 |
|---|---|---|---|---|---|---|---|
| Traffic | .917 | .412 | .412 | .412 | .525 | .525 | .525 |
| Link | 116 | 214 | 124 | 221 | 123 | 121 | 224 |
| Traffic | .505 | .505 | .212 | .962 | .750 | .750 | 2.404 |

TABLE V (Link Status)

| Link | Status | Link | Status | Link | Status |
|---|---|---|---|---|---|
| 111 | 0 | 116 | 122 | 213 | 0 |
| 112 | 0 | 117 | 123 | 214 | 0 |
| 113 | 1 | 118 | 124 | 215 | 0 |
| 114 | 0 | 119 | 211 | 216 | 0 |
| 115 | 0 | 121 | 212 | 217 | 1 |

The information contained in Tables I, II, and III is static. Of course, the information is Tables IV and V is not, for it reflects the outgoing call activity of the edge node. The information in table VI is also not static, but it differs in nature from the information of Tables IV and V in that the source of the information is outside the edge node; that is, the source is CFNI 40.

More specifically, each edge node is aware of the traffic that it contributes to the network. It is also aware of all outgoing and incoming traffic on its α links; but that information need not necessarily be directly utilized. The important fact to note is that an edge node does not, by itself, know the traffic level on the various α links of the other edge nodes and the β links of network 10. That's where CFNI 40 comes in. Each edge node communicates to CFNI 40, on a regular basis, the information of table V. CFNI 40 needs to only combine the information provided by the various edge nodes sum the traffic, compare the traffic on each link to the capacity of that link and make a determination whether the capacity can support additional traffic, giving the link the "green" status 0; or that the capacity is considerably used up, giving the link an "orange" cautionary status 1; or that the capacity is close to being used up, giving the link a "red" stop status 2. This status information is communicated by CFNI 40 back to the different nodes and those nodes populate Table VI with this data. As an aside, there can be more than three status states, each corresponding to a selected threshold and each having a different preselected effect.

Armed with a routing Tables I–VI, an edge node can handle set-up requests quite easily. For example, a call originating in edge node 270 may be assigned a circuit ID, say Caaa, and a bandwidth requirement for that circuit may be determined to be, say, 384 kbps. Next, the destination edge node is ascertained, and that may be edge node 220. The ascertaining of the destiantion edge node may be carried out by the call processing logic in controller 50 associated with edge node 270. The controller then checks whether sufficient capacity is available on one of several pre-provisioned routes. With reference to Table II, the controller determines that the routes corresponding to VPIs B1, B2, B3 and B4 are so pre-provisioned. A reference to Table III identifies the links that would be employed in the course of using one of the identified VPIs, and a review of Table VI tells whether use of any of the VPIs should be avoided because of an "oragne" status on one or more of the links deisgnated for that VPI. When such look-ups are made for the illustrated Tables, it is determined that line 118 has an "oragne" status and therefore it is wiser to select VPI B3. Knowing that a call to edge node 220 can be established, edge node 270 signals edge node 220 that it wants to set up a call on circuit ID Caaa. This signaling could be done either out of band, using signaling network 30, or the signaling messages themselves could be made to travel through the ATM backbone network. Edge node 220, upon receiving the signaling message, checks for available capacity on one of several pre-provisioned paths in the reverse direction, say a VPI B33 (which corresponds to a path that includes links 213, 116, 118, and 224), assigns a circuit ID Cbbb to this connection, and signals back to edge node 270, passing to it the circuit "Cbbbb" deisgnation. At this point, edge noded 220 sends ATM cells that carry identifiers VPI B33 (not identified as such in any of the drawings) and VCI Caaa, and edge node 270 sends ATM cells with identifiers VPI B3 and VCI Cbbb.

The small size of the tables in each edge node that maintains information about the traffic contributed to the network by that edge node makes frequent updates and fast routing decisions easier to implement. The computation and control functionality that has been described above can be placed either in the edge node or in a closely linked adjunct. The CFNI functionality can reside in a specially designated edge node, a network database (SCP), or a stand-alone network element. The CPNI can be replicated for reliability, and it can also be implemented in a distributed manner.

A modification of this routing scheme would allow each edge node to reserve a certain amount of capacity on each β link with only the unreserved capacity available to all paths. This would allow some degree of service protection to each edge node as well as improving the stability of the network under overloads.

The arrangement disclosed herein is robust to network outages as well as congestion. If a link or node should fail, then affected paths could be marked "black" (congestion status 2, for example) and no new call would be routed to them. The algorithm described above could be used to balance the loads across the remaining routes. Calls in progress, which are normally lost at the time of a network failure, could be re-routed in real time to alternate paths.

The above disclosed the principles of our invention by way of illustrative embodiments. Various modifications are of course possible which are included within the spirit and scope of this disclosure. For example, whereas the above disclosure employs the CFNI to ensure that all edge nodes have the information that is necessary for intelligently setting up routes, it should be clear to skilled artisans that it is the end result that is significant, and not the manner of implementation. Thus, for example, the information that each edge node sends to the CFNI could be broadcast to all of the edge nodes through the SS7 network or through the ATM network itself.

We claim:

1. A network comprising a plurality of switches interconnected by means of $\beta$ links and edge nodes that connect to at least some of said switches via $\alpha$ links and also connect to apparatus outside said network, and where datagrams are launched onto said network by said edge nodes, with each of said datagrams including a VPI, and an edge node destination, characterized in that:

said switches route said datagrams according to the dictates of said VPI, and a first edge node of said edge nodes that is coupled to a first switch of said switches, when launching a first one of said datagrams to a second edge node of said edge nodes, employs a first VPI; and a third edge node of said edge nodes that is coupled to a second switch of said switches that is different from said first switch, when launching a second one of said datagrams to said second edge node of said edge nodes, employs said first VPI.

* * * * *